(12) United States Patent  
Kishimoto et al.

(10) Patent No.: US 9,092,446 B2  
(45) Date of Patent: Jul. 28, 2015

(54) STORAGE SYSTEM AND FILE MANAGEMENT METHOD

(71) Applicant: Hitachi, Ltd., Tokyo (JP)

(72) Inventors: Satoru Kishimoto, Odawara (JP); Youji Nakatani, Yokohama (JP); Mitsunori Satomi, Tokyo (JP); Yoji Sunada, Yokohama (JP)

(73) Assignee: HITACHI, LTD., Tokyo (JP)

( * ) Notice: Subject to any disclaimer, the term of this patent is extended or adjusted under 35 U.S.C. 154(b) by 209 days.

(21) Appl. No.: 13/704,166

(22) PCT Filed: Nov. 29, 2012

(86) PCT No.: PCT/JP2012/007656  
§ 371 (c)(1),  
(2) Date: Dec. 13, 2012

(87) PCT Pub. No.: WO2014/083591  
PCT Pub. Date: Jun. 5, 2014

(65) Prior Publication Data  
US 2014/0149476 A1 May 29, 2014

(51) Int. Cl.  
*G06F 17/30* (2006.01)  
*G06F 11/14* (2006.01)  
*G06F 3/06* (2006.01)

(52) U.S. Cl.  
CPC .......... *G06F 17/30156* (2013.01); *G06F 3/067* (2013.01); *G06F 3/0613* (2013.01); *G06F 3/0641* (2013.01); *G06F 3/0689* (2013.01); *G06F 11/1451* (2013.01); *G06F 3/0608* (2013.01); *G06F 17/30303* (2013.01)

(58) Field of Classification Search  
CPC ............ G06F 17/30303; G06F 3/0608; G06F 3/0641; G06F 3/0689  
USPC ......... 707/625, 679, 610, 609, 692, 816, 827; 711/154, 141, 161, 162, 170, 217  
See application file for complete search history.

(56) References Cited

U.S. PATENT DOCUMENTS

| | | | |
|---|---|---|---|
| 7,822,939 B1 | 10/2010 | Veprinsky et al. | |
| 7,921,077 B2 * | 4/2011 | Ting et al. | 707/610 |
| 8,099,571 B1 * | 1/2012 | Driscoll et al. | 711/162 |
| 8,290,911 B1 | 10/2012 | Janakiraman et al. | |
| 8,296,260 B2 * | 10/2012 | Ting et al. | 707/610 |

(Continued)

FOREIGN PATENT DOCUMENTS

EP 1933236 A1 6/2008  
WO 2011148496 A1 12/2011

*Primary Examiner* — Jean M Corrielus  
(74) *Attorney, Agent, or Firm* — Volpe and Koenig, P.C.

(57) ABSTRACT

In a first file storage apparatus, a first controller, which manages a first file system comprising a plurality of files, transfers a copy of the first file to a second file storage apparatus when managing the first file, manages the copy of the first file as a first replication file, configures the replication destination of the first replication file in the first file as a first pointer and, when processing a second file as a de-duplication target file, manages the first replication file as a copy of the first file and second file, configures a first pointer in the second file, and deletes the first data on condition that the storage destination of the first data which comprises the first file has been configured in the first file, or deletes the second data on condition that the storage destination of the second data which comprises the second file has been configured in the second file.

12 Claims, 16 Drawing Sheets

(56) References Cited

U.S. PATENT DOCUMENTS

| | | | |
|---|---|---|---|
| 8,352,422 B2* | 1/2013 | Prahlad et al. | 707/609 |
| 8,504,515 B2* | 8/2013 | Prahlad et al. | 707/609 |
| 8,688,632 B2* | 4/2014 | Niki | 707/610 |
| 8,725,695 B2* | 5/2014 | Ogasawara et al. | 707/644 |
| 8,725,698 B2* | 5/2014 | Prahlad et al. | 707/679 |
| 8,799,367 B1* | 8/2014 | Condict et al. | 709/205 |
| 2008/0005201 A1* | 1/2008 | Ting et al. | 707/204 |
| 2011/0035357 A1* | 2/2011 | Ting et al. | 707/634 |
| 2011/0066666 A1* | 3/2011 | Takaoka et al. | 707/816 |
| 2011/0246416 A1* | 10/2011 | Prahlad et al. | 707/610 |
| 2011/0246429 A1* | 10/2011 | Prahlad et al. | 707/679 |
| 2011/0246430 A1* | 10/2011 | Prahlad et al. | 707/679 |
| 2012/0016838 A1 | 1/2012 | Arai et al. | |
| 2012/0066179 A1* | 3/2012 | Saika | 707/634 |
| 2012/0151250 A1* | 6/2012 | Saika | 714/4.11 |
| 2012/0191671 A1* | 7/2012 | Kitamura et al. | 707/692 |
| 2012/0254555 A1* | 10/2012 | Miwa et al. | 711/154 |
| 2013/0073519 A1* | 3/2013 | Lewis et al. | 707/610 |
| 2013/0218847 A1* | 8/2013 | Saika, Nobuyuki | 707/692 |
| 2014/0172792 A1* | 6/2014 | Kabano et al. | 707/625 |

* cited by examiner

FIG.3

| INODE 74A | FILE NAME 74B | FILE SIZE 74C | HASH VALUE 74D | SECOND FILE REPLICATION DESTINATION 74E | GI FLAG 74F | STUB FLAG 74G | RECALL FLAG 74H | FILE UPDATE DATE AND TIME 74I |
|---|---|---|---|---|---|---|---|---|
| 1 | A | 100MB | a100 | Tenant1/A | OFF | OFF | OFF | 2012.8.3 |
| 2 | B | 500MB | b500 | Tenant1/B | OFF | ON | ON | 2012.5.1 |
| 3 | C | 1GB | 00c1 | Tenant/C | ON | ON | OFF | 2012.4.1 |
| 4 | D | 1GB | 00c1 | Tenant/C | ON | OFF | OFF | 2012.4.16 |
| 5 | E | 5GB | 00e5 | Tenant/E | OFF | OFF | OFF | 2012.12.1 |
| 6 | F | 10G | 0f10 | - | ON | OFF | OFF | 2012.12.2 |

| MIGRATION EXECUTION DATE AND TIME 74J |
|---|
| 2012.5.3 |
| 2012.4.1 |
| 2012.3.1 |
| 2012.5.16 |
| 2012.11.1 |
| 2012.12.15 |

FIG.4

| INODE | FILE NAME | FILE SIZE | HASH VALUE | REFERENCE COUNTER |
|---|---|---|---|---|
| 50 | X | 1GB | 00c1 | 2 |
| 51 | Y | 10GB | 0f10 | 1 |

FIG.5

| INODE | FILE NAME | CREATION DATE AND TIME | UPDATE DATE AND TIME | REFERENCE CONFIGURATION |
|---|---|---|---|---|
| 1 | A | 2012.8.1 | 2012.8.1 | GI FILE |
| 2 | A' | 2012.8.9 | 2012.8.9 | GI FILE |
| 3 | GI | 2012.8.9 | 2012.8.9 | - |

FIG.6

| # | GI FLAG (90) | STUB FLAG (92) | RECALL FLAG (94) | FILE EXISTENCE DETERMINATION (96) |
|---|---|---|---|---|
| 1 | ON | ON | ON | NONE |
| 2 | ON | ON | OFF | EXISTS |
| 3 | ON | ON | ON | NONE |
| 4 | ON | OFF | OFF | EXISTS |
| 5 | OFF | OFF | ON | EXISTS |
| 6 | OFF | ON | OFF | NONE |
| 7 | OFF | ON | ON | NONE |
| 8 | OFF | OFF | OFF | EXISTS |

STORAGE SYSTEM AND FILE MANAGEMENT METHOD

TECHNICAL FIELD

The present invention relates to a storage system which exchanges information via a network between a plurality of local file storage apparatuses and a remote file storage apparatus, and to a file management method.

BACKGROUND ART

A method has been adopted where, in a plurality of local file storage apparatuses which are connected to a remote file storage apparatus via a network, copies of file write data are transferred at regular intervals to a remote file storage apparatus as replication files and the replication files are stored in the remote file storage apparatus as backup files. Here, technology which deletes data of files in the local file storage apparatus (edge-side file storage apparatus), manages the files as stub files, and suppresses an increase in the capacity of storage devices for storing files (see PTL 1).

CITATION LIST

Patent Literature

[PTL 1]
WO 2011/148496

SUMMARY OF INVENTION

Technical Problem

However, in the case of PTL 1, no consideration is given to de-duplication processing, in each edge-side file storage apparatus, to eliminate the duplication of processing of a plurality of files when processing a plurality of files with the same data. Hence, in a case where a first file and a second file with the same data are processed by using the technology mentioned in PTL 1, a copy of write data of a first file is transferred to the remote file storage apparatus as a replication file, and a copy of write data of a second file is transferred to the remote file storage apparatus as a replication file, whereby the data transfer amount increases and the network line load increases.

Therefore, in the technology mentioned in PTL 1, de-duplication processing cannot be efficiently executed for a plurality of files in a process where a file changes to a normal file, a replicated file, or a stub file.

The present invention was conceived in view of problems faced by the prior art and an object thereof is to provide a storage system and a file management method which enable a data transfer amount to be reduced when processing de-duplication target files.

Solution to Problem

In order to solve the foregoing problem, the present invention is a storage system in which a plurality of first file storage apparatuses are connected to a second file storage apparatus, wherein, when a first file, which is stored in a first file storage apparatus and which stores a first replication file in a second file storage apparatus, and a second file, which is stored in the first file storage apparatus after the first file, are managed as de-duplication target files, a first pointer indicating a replication destination of the first replication file is configured in the first file, the first replication file is managed as a copy of the first file and a copy of the second file, the first pointer is configured in the second file, and the first data is deleted on condition that a storage destination of the first data comprising the first file has been configured in the first file, or the second data is deleted on condition that a storage destination of the second data comprising the second file has been configured in the second file.

Advantageous Effects of Invention

The present invention enables a data transfer amount to be reduced when processing de-duplication target files.

BRIEF DESCRIPTION OF DRAWINGS

FIG. 3 is a configuration diagram of a file management table.
FIG. 4 is a configuration diagram of a GI management table.
FIG. 5 is a configuration diagram of an inode management table.
FIG. 6 is a flag state diagram.

DESCRIPTION OF EMBODIMENTS

Example

The present example is devised such that, when a first file among a plurality of files is processed, if a copy of a first file is transferred from a first file storage apparatus to a second file storage apparatus, the copy of the first file is managed as a first replication file and, when a second file is processed as a de-duplication target file in the process of managing the first file by changing the first file from a first normal file to a first stub file, a GI file is created, second data comprising a second file is stored in the created GI file, the first replication file is managed as a copy of the second file, a second reference destination to the effect that the storage destination of the second data is a GI file is configured in the metadata of the second file, and a first reference destination to the effect that the storage destination of the first data is the GI file is configured in the metadata of the first file, and then the second data is deleted.

Figure 1:
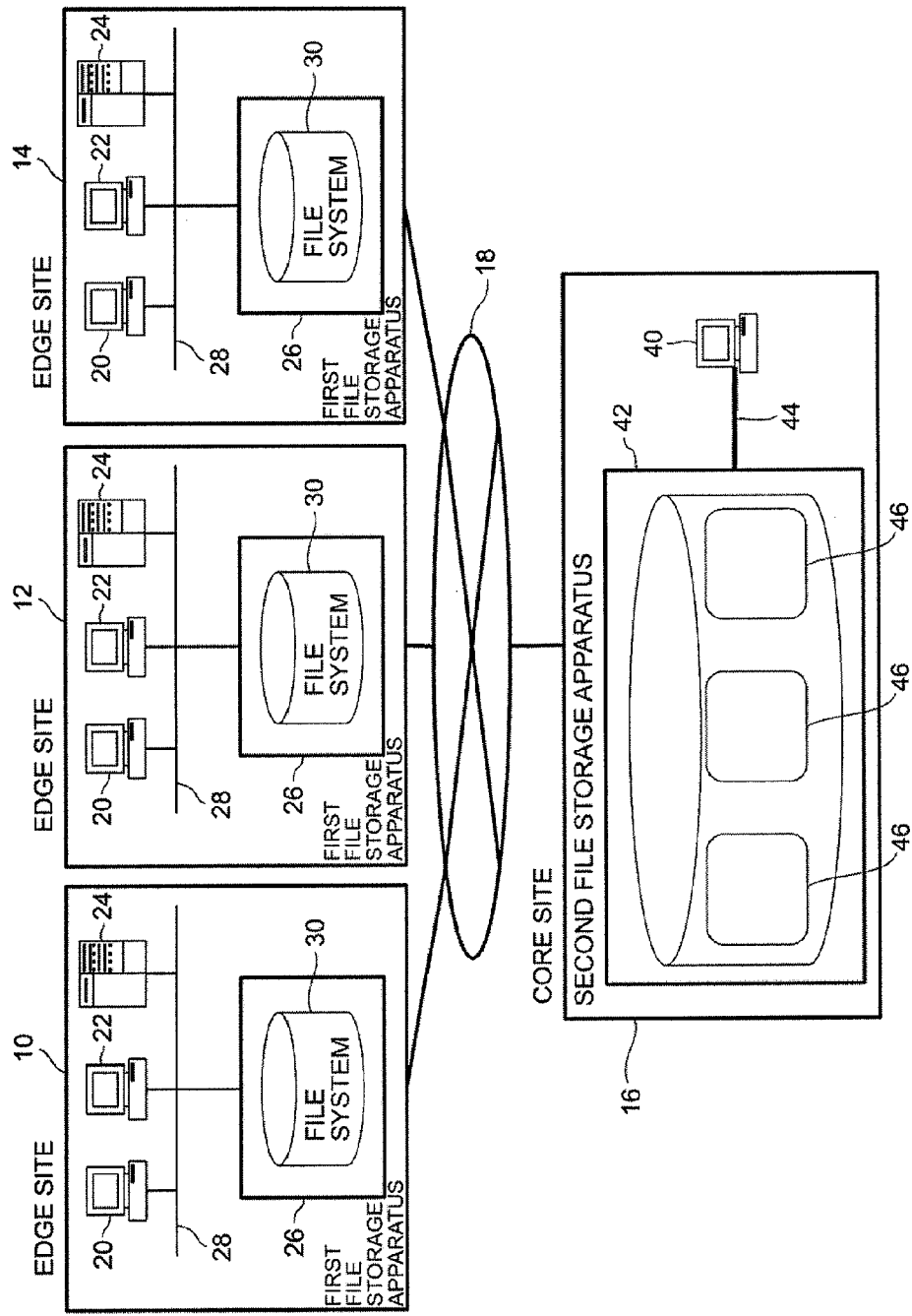
FIG. 1 is an overall configuration diagram of a storage system.

An Example of the present invention will be described herein below on the basis of the drawings. FIG. 1 is an overall configuration of a storage system. In FIG. 1, the storage system comprises edge sites 10, 12, and 14 and a core site 16, and each of the edge sites 10, 12, and 14 and the core site 16 are each interconnected via a network 18.

The edge sites 10, 12, and 14 are each sites comprising a local computer, for example sites where the user actually performs a task such as a store or place of business. The edge sites 10, 12, and 14 comprise PC (Personal Computers) 20, 22, a file server 24, and a first file storage apparatus (local file storage apparatus) 26 which are interconnected via a bus 28. A first file system 30 which comprises files and directories is connected to the first file storage apparatus 26. Note that the edge sites 10, 12 and 14 each have the same configuration and the description herein below will mainly focus on the edge site 10 among the edge sites 10, 12, and 14.

The core site 16 is a site comprising a remote computer, for example a site for centrally managing servers or storage apparatuses or a site for providing cloud services, or the like. This core site 16 comprises a PC 40 and a second file storage apparatus (remote file storage apparatus) 42 and the PC 40 and second file storage apparatus 42 are connected via a bus 44. A plurality of file systems 46 which correspond to a plurality of tenants which are file systems comprising files and directories are constructed in the second file storage apparatus 42.

Figure 2:
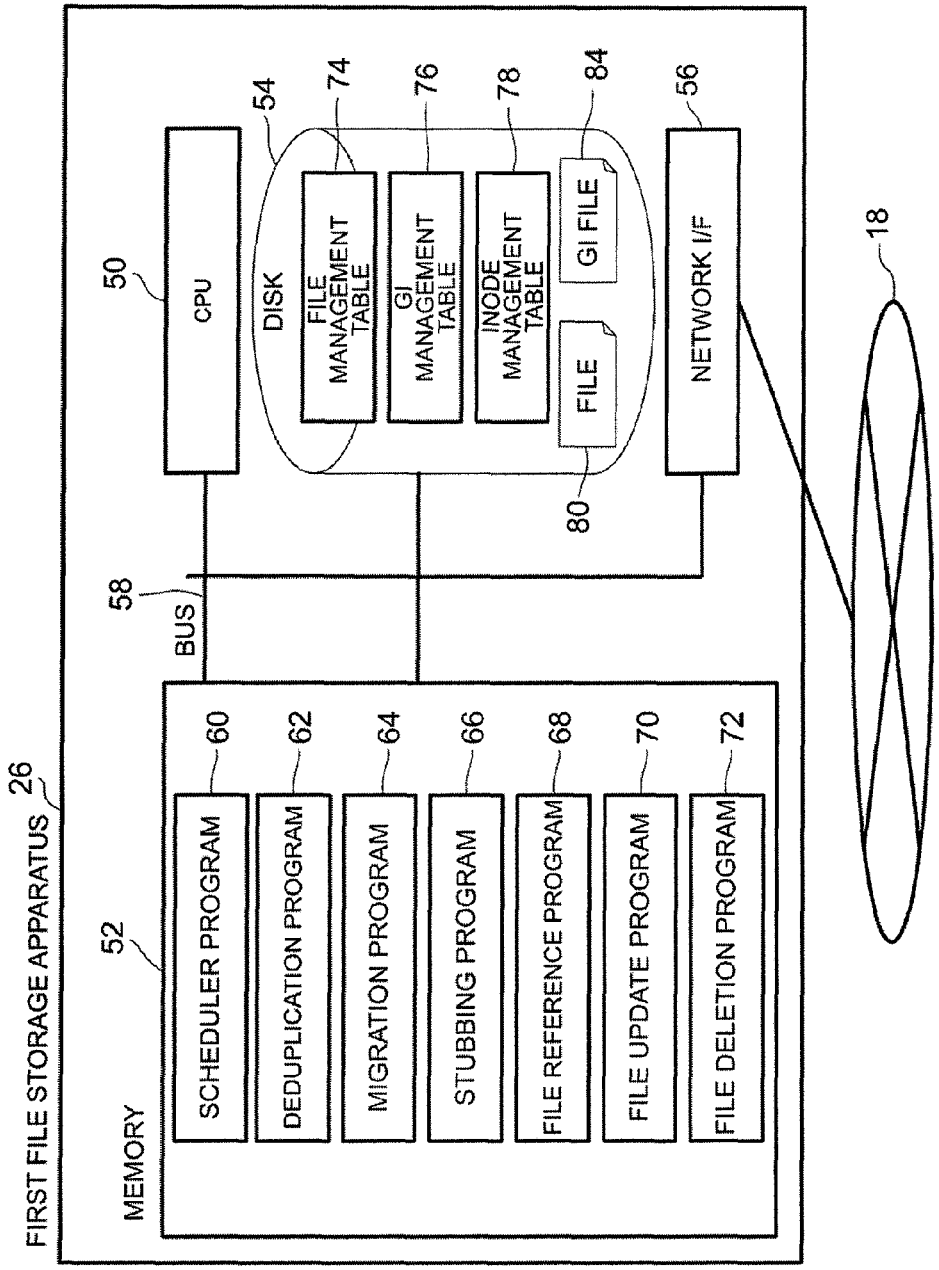
FIG. 2 is a configuration diagram of a first file storage apparatus.

FIG. 2 is a configuration diagram of a first file storage apparatus. In FIG. 2, the first file storage apparatus 26 is configured from a CPU (Central Processing Unit) 50, a memory 52, a disk 54, and a network interface (I/F) 56, and each of the parts are interconnected via a bus 58.

The CPU 50 is configured as a first controller for centrally managing the whole first file storage apparatus 26 and executes various processing in accordance with a program which is stored in the memory 52.

The memory 52 is a storage device for storing information such as various programs. The memory 51 stores a scheduler program 60 for managing schedules of various programs, a de-duplication program 62 for executing file de-duplication, a migration program 64 for executing file migration, a stubbing program 66 for executing file stubbing, a file referencing program 68 for executing file referencing, a file update program 70 for executing file updates, and a file deletion program 72 for executing file deletion.

The scheduler program 60 starts any of the programs among the de-duplication program 62, the migration program 64, and the stubbing program 66 on the basis of a schedule configured by the user. The file referencing program 68, the file update program 70, and the file deletion program 72 are started in response to an API (Application Programming Interface) call from the user.

The disk 54 is a storage device for storing information such as various tables and files and is configured from storage devices such as HDD (Hard Disk Drives), for example. This disk 54 stores a file management table 74, a GI (Golden Image) management table 76, and an inode management table 78, and stores a plurality of files 80 and one or more GI files 84. The GI files 84 are files for which, among the plurality of files 80, duplicate processing of the files 80 must be eliminated and which are configured as shared files for storing data of the files which are de-duplication target files. Here files are a collection of data with a fixed relationship which comprise a file body or file entity as real data and metadata. Further, the metadata is file attribute information which comprises information relating to file path, file size, file existence, file hash value, file update date and time, and stub existence, and the like.

The network interface 56 is configured as an interface for exchanging data with another first file storage apparatus 26 or second file storage apparatus 42 via a network 18.

Note that the second file storage apparatus 42 can be configured as an apparatus which, like the first file storage apparatus 26, comprises a CPU, a memory, a disk, a network interface (I/F), and a bus. In this case, the CPU of the second file storage apparatus 42 functions as a second controller which performs the exchange of data and information with the first file storage apparatus 26 via the network 18 and which manages the file system 46.

FIG. 3 is a configuration diagram of the file management table. In FIG. 3, the file management table 74 is a table for managing the files 80 which are constructed in the first file system 30 of the first file storage apparatus 26 as replicated files, stub files, or de-duplicated files, for example, and is configured from an inode field 74A, a file name field 74B, a file size field 74C, a hash value field 74D, a second file storage apparatus replication destination field 74E, a GI graph field 74F, a stub flag field 74G, a recall flag field 74H, a file update date and time field 74I, and a migration execution date and time field 74J.

An inode is an identifier enabling the inodes of each file 80 constructed in the first file system 30 to be uniquely identified by the first file system 30.

The file name is the file name of each file 80 constructed in the first file system 30. The file size is information indicating the capacity of each file 80 constructed in the first file system 30. The hash value is a hash value which is obtained from the data of each file 80 constructed in the first file system 30. If files 80 with identical hash values exist, these files 80 are managed as files 80 with the same data. For example, because the respective hash values of a file 80 with the file name C and a file 80 with the file name D are "00c1", these files 80 are managed as files comprising the same data.

The replication destination of the second file storage is information indicating the replication destination of the replication file (copy of the file 80 stored in the first file storage apparatus 26) which is replicated from the first file storage apparatus 26 to the second file storage apparatus 42. The name of the file system 46 where the replication file is stored, for example "Tenant 1/A", is stored, as information on the replication destination of the replication file, in the entry of the replication destination field 74E of the second file storage.

The GI flag is information indicating the existence of de-duplication execution on the files 80. If de-duplication processing has not been executed on the files 80, "OFF" is stored in the entry of the GI flag field 74F, and if de-duplication processing is executed on the files 80, "ON" information is stored as an entry of the GI flag field 74F.

The stub flag is information indicating whether the files 80 have been stubbed. If the files 80 have not been stubbed, "OFF" information is stored as an entry of the stub flag field 74G, and if the file 80 has been stubbed and is managed as a stub file, that is, if data (real data) of the file 80 has been deleted and only metadata of the file 80 exists, "ON" information is stored.

The recall flag is information indicating whether it is necessary to recall a replication file stored in the second file storage apparatus 42 from the second file storage apparatus 42 to the first file storage apparatus 26. If it is not necessary to recall a replication file as an entry of the recall flag field 74H, "OFF" information is stored, and when a replication file must be recalled, "ON" information is stored.

The file update date and time is information indicating the date and time (day, month, year) when data is stored in the file 80 and when the data of the file 80 is updated.

The migration execution date and time is information indicating the date and time (day, month, year) when the file 80 is migrated (replicated) from the first file storage apparatus 26 to the second file storage apparatus 42 and when the file 80 is stored in the second file storage apparatus 42 as a replication file.

Here, when the CPU 50 manages files 80 for constructing the first file system 30, if the files 80 comprise data (real data) and metadata indicating information for managing the data, [the files 80] are managed as normal files. If a data copy of a normal file is replicated (migrated) from the first file storage apparatus 26 to the second file storage apparatus 42, a replication file comprising the normal file data copy is stored in the second file storage apparatus 42 and if information indicating the replication destination of the replication file (storage destination of the normal file data) is configured as a pointer in the normal file metadata, the normal file is managed as a replicated file. The replicated file is managed as a stub file (stubbed file) if the data of the replicated file is deleted, only metadata exists, and if information indicating the replication destination (data storage destination of the normal file) of the replication file has been configured as a pointer in the metadata.

Further, the normal file is managed as a de-duplication target file if the data of the normal file matches the data of the other files, for example the data of a stub file (data which is deleted when the stub file changes from a replicated file to a stub file). The de-duplication target file is managed as a de-duplicated file if data matching the stub file data is deleted and the deleted data is stored in the GI file 84. Information to the effect that the data storage destination is a GI file is configured as a reference destination in the metadata of the de-duplicated file and information indicating the replication destination of the replication file (the copy destination of the replicated file which is the original file of the stub file) is configured as a pointer. In this case, information to the effect that the data storage destination is the GI file 84 is configured as a reference destination in the metadata of the stub file (stubbed file). Note that the files 80 are managed such that an inode has a fixed value even if a file 80 is changed to a normal file, a replicated file, a stub file (stubbed file) or a de-duplicated file.

FIG. 4 is a configuration diagram of the GI management table. In FIG. 4, the GI management table 76 is a table for managing information of the GI file 84 stored on the disk 54 and is configured from an inode field 76A, a file name field 76B, a file size field 76C, a hash value 76D, and a reference counter field 76E.

An inode is an identifier enabling each GI file 84 stored on the disk 54 to be uniquely identified by the first file storage apparatus 26. A file name is the name of each GI file 84 stored on the disk 54. The file size is information indicating the capacity of each GI file stored on the disk 54. The hash value is information relating to the hash value obtained from the data of each GI file 84 stored on the disk 54.

The reference counter is information indicating the number of files 80 for which the GI file 84 is the reference destination. Here, if the GI file 84 with the file name "X" is configured as the reference destination (data storage destination) of two files with identical data (files 80 with the file names C and D whose hash value is "00c1"), for example, "2" is stored as an entry of the reference counter field 76E. Further, if the GI file 84 is configured as a reference destination (data storage destination) of one file 80, for example the file 80 with the file name F whose hash value is "0f10", "1" information is stored as an entry of the reference counter field 76E.

FIG. 5 is a configuration diagram of an inode management table. In FIG. 5, the inode management table 78 is a table for managing inodes of each file 80 which are constructed in the first file system 30 of the first file storage apparatus 26 and is configured from an inode field 78A, a file name field 78B, a creation date and time field 78C, an update date and time field 78D, and a reference configuration field 78E.

An inode is an identifier enabling the inode of each file constructed in the first file system 30 to be uniquely identified by the first file system 30. The file name is the file name of each file 80 constructed in the first file system 30. The creation date and time is information indicating the creation date and time of each file 80 constructed in the first file system 30.

The update date and time is information indicating the date and time when the update data is stored in each file 80 constructed in the first file system 30 and when the data of each file 80 is updated.

The reference configuration is information indicating the reference destination (data storage destination) of the files 80 with data stored in the GI file 84 among each of the files 80 constructed in the first file system 30. If the data of each file 80 constructed in the first file system 30 is stored in the GI file 84, "GI file" information is stored as an entry of the reference configuration field 78E. If the data of each file 80 constructed in the first file system 30 is not stored in the GI file 84, the information "-" is stored as an entry in the reference configuration field 78E.

FIG. 6 is a flag state diagram. In FIG. 6, the CPU 50 is able to determine the existence of a file 80 by managing the combination of a GI flag 90, a stub flag 92, and a recall flag 94. For example, in the case of a combination in which the GI flag 90 is "ON", the stub flag 92 is "ON", and the recall flag 94 is "ON", the file 80 does not exist in the first file system 30, and hence the CPU 50 determines the file existence determination 96 as "none." In this case, the stub file takes the GI file storing the data of the stub file as the reference destination and, even when the stub file is accessed, recall is not generated.

In the case of a combination in which the GI flag 90 is "ON", the stub flag 92 is "ON", and the recall flag 94 is "OFF", the file 80 exists in the first file system 30 and hence the CPU 50 determines the file existence determination 96 to be "present." The file 80 in this case corresponds to a stub file in which the GI file 84 is the reference destination.

In the case of a combination in which the GI flag 90 is "ON", the stub flag 92 is "OFF", and the recall flag 94 is "ON", the file 80 does not exist in the first file system 30, and hence the CPU 50 determines the file existence determination 96 to be "none." In this case, recall is not generated for files 80 other than stub files.

In the case of a combination in which the GI flag 90 is "ON", the stub flag 92 is "OFF", and the recall flag 94 is "OFF", the file 80 exists in the first file system 30, and hence the CPU 50 determines the file existence determination 96 to be "present." The file 80 in this case corresponds to a de-duplicated file and a replicated file.

In the case of a combination in which the GI flag 90 is "OFF", the stub flag 92 is "ON", and the recall flag 94 is "ON", the file 80 exists in the first file system 30, and hence the CPU 50 determines the file existence determination 96 to be "present." The file 80 in this case corresponds to a stub file for which de-duplication has not been performed.

In the case of a combination in which the GI flag 90 is "OFF", the stub flag 92 is "ON", and the recall flag 94 is "OFF", the file 80 does not exist in the first file system 30, and hence CPU 50 determines the file existence determination 96 to be "none." In this case, the stub files must be managed as files 80 for which the GI file must be referenced or managed as files 80 for executing recall.

In the case of a combination in which the GI flag 90 is "OFF", the stub flag 92 is "OFF", and the recall flag 94 is "ON", the file 80 does not exist in the first file system 30 and hence the CPU 50 determines the file existence determination 96 to be "none." In this case, because the file 80 is a file other than a stub file, recall is not generated.

In the case of a combination in which the GI flag 90 is "OFF", the stub flag 92 is "OFF", and the recall flag 94 is "OFF", the file 80 exists in the first file system 30, and hence the CPU 50 determines the file existence determination 96 to be "present." The file 80 in this case corresponds to a replicated file.

Figure 7:
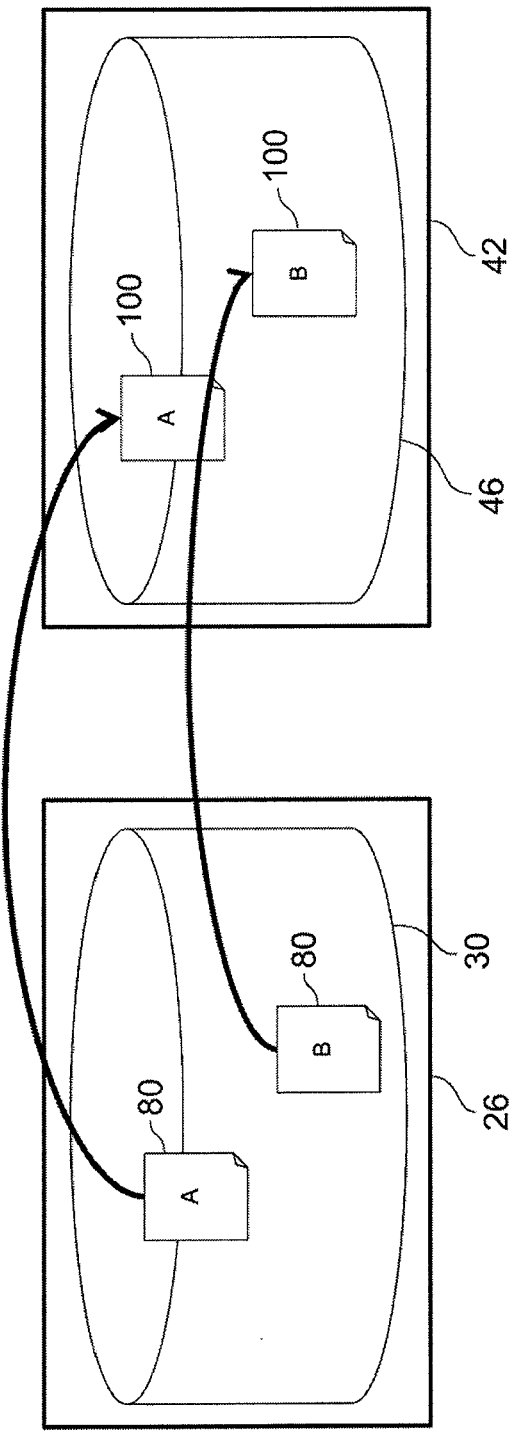
FIG. 7 is a conceptual diagram serving to illustrate file migration.

FIG. 7 is a conceptual diagram serving to illustrate file migration. In FIG. 7, the file 80 constructed in the first file system 30 of the first file storage apparatus 26 is replicated in the file system 46 of the second storage apparatus 42 at regular intervals, for example. Here, file migration is processing for replicating (copying) files 80 in the first file storage apparatus 26 to the second file storage apparatus 42. That is, file migration is processing for copying and storing a copy of the file 80 in the first file storage apparatus 26 to the second file storage apparatus 42.

The file replicated to the second file storage apparatus 42 is managed as a replication file 100 which represents a copy of the file 80. Further, files (files with file names A and B) 80 for which the replication file 100 exists in the second file storage apparatus 42 are managed as replicated files. A pointer indicating the replication destination of the replication file 100 is configured in the replicated file metadata.

Figure 8:
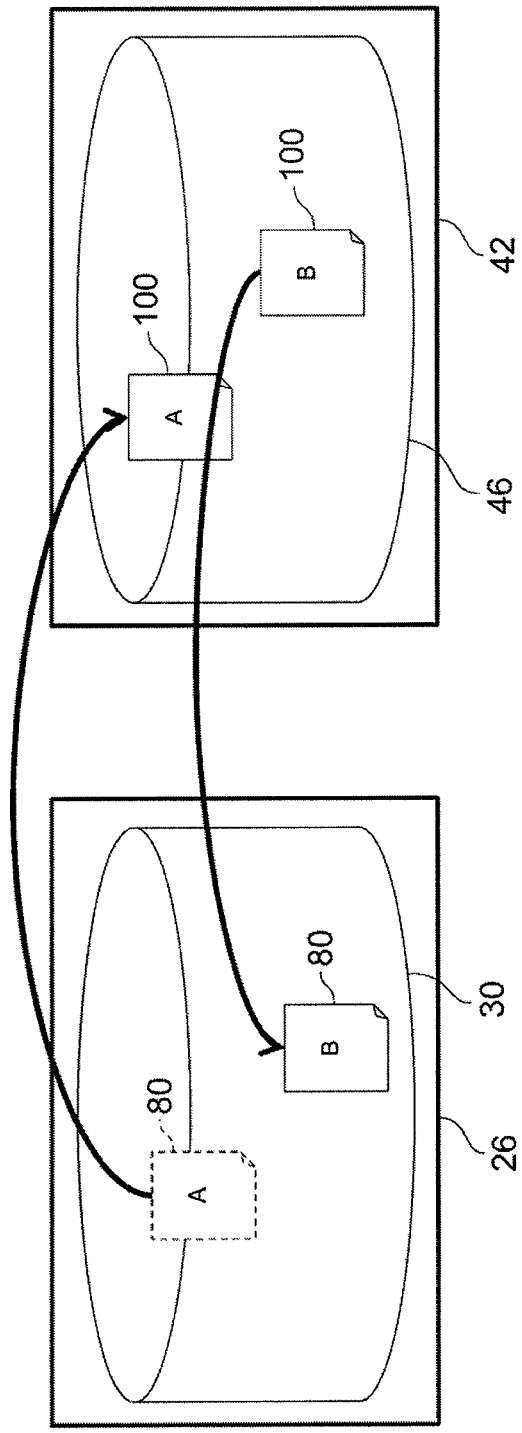
FIG. 8 is a conceptual diagram serving to illustrate file stubbing.

FIG. 8 is a conceptual diagram serving to illustrate file stubbing. In FIG. 8, the files 80 which the first file system 30 of the first file storage apparatus 26 comprises are stubbed and managed as stub files if the replication file 100 exists in the second file storage apparatus 42 and on condition that there is a drop in the frequency of access to the files 80, for example. For example, if the file 80 with the file name A is stubbed, the file with the file name A only has its metadata remaining, all its data being deleted, and is managed as a stub file. In this case, the replication destination of the replication file 100 is configured by a pointer in the metadata of the stub file.

Further, when the file 80 with the file name B is stubbed and is managed as a stub file, if the file 80 with the file name B is accessed, the replication file 100 is recalled from the second file storage apparatus 42 on the basis of the pointer configured in the metadata of the stub file, and the data of the replication file 100 is stored in the file 80 with the file name B. In this case, the file 80 with the file name B is restored from a stub file to a normal file and is managed as a normal file.

Figure 9:
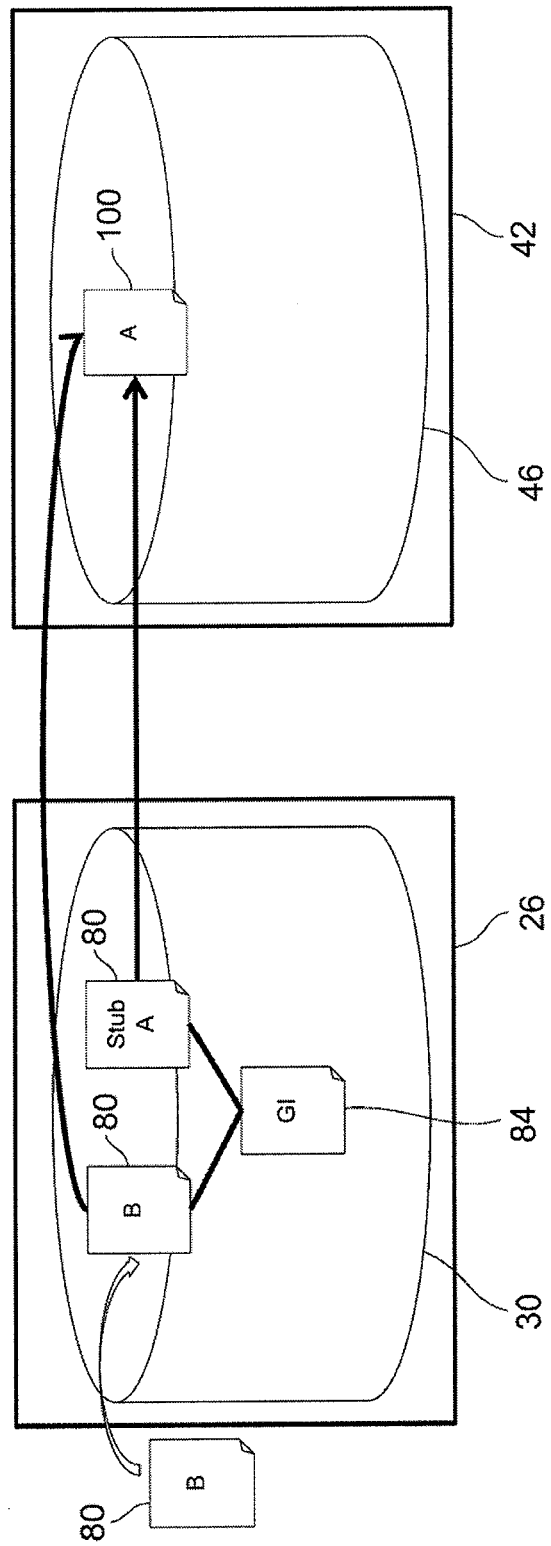
FIG. 9 is a conceptual diagram serving to illustrate de-duplication of files.

FIG. 9 is a conceptual diagram serving to illustrate file de-duplication. In FIG. 9, if the replication file 100 of the file 80 with the file name A exists in the second file storage apparatus 42 and the file 80 with the file name A is being managed as a stub file, a pointer indicating the replication destination of the replication file 100 is configured in the metadata of the file 80 with the file name A. Subsequently, if the file 80 with the file name B is stored in the first file storage apparatus 26, the file 80 with the file name B is managed as a new storage file.

In addition, if the data of the file 80 with the file name B matches the data of the file 80 with the file name A, for example if the hash value obtained from the data of the file 80 with the file name B matches the hash value obtained from the data of the file 80 with the file name A, the file 80 with the file name B and the file 80 with the file name A are managed as de-duplication target files.

Here, in order to store the data of the file 80 with the file name B, the GI file 84 is created and data of the file 80 with the file name B is stored in the GI file 84. Thereafter, the data of the file 80 with the file name B is deleted and a pointer indicating the replication destination of the replication file 100, which is information to the effect that a copy of the data of the file 80 with the file name B is the replication file (replication file of the file 80 with the file name A) 100, is configured in the metadata of the file 80 with the file name B. That is, the replication file 100 is a replication file shared by the file 80 with the file name A and the file 80 with the file name B.

Hence, when the file 80 with the file name B is processed, processing to replicate a copy of the data of the file 80 with the file name B from the first file storage apparatus 26 to the second file storage apparatus 46 is unnecessary and an increase in the data transfer amount can be suppressed. In addition, reference destination information indicating that the data storage destination of the file 80 with the file name B and the data storage destination of the file 80 with the file name A are GI files 84 is managed in the inode management table 78 as a reference setting. In this case, the file 80 with the file name B and the file 80 with the file name A are managed as de-duplicated files.

If the file 80 with the file name B and the file 80 with the file name A are accessed after the file 80 with the file name B and the file 80 with the file name A have been managed as de-duplicated files, the data of the file 80 with the file name B and the data of the file 80 with the file name A can be accessed by referencing the inode management table 78 and accessing the GI file 84. Hence, even when the file 80 with the file name B or the file 800 with the file name A are accessed, there is no need to recall the replication file 100 and it is possible to reduce the data transfer amount from the second file storage apparatus 46 to the first file storage apparatus 26 and suppress an increase in the line load of the network 18. Note that if the update data of the de-duplicated file is stored, the update data is managed as differential data in the de-duplicated file.

Figure 10:
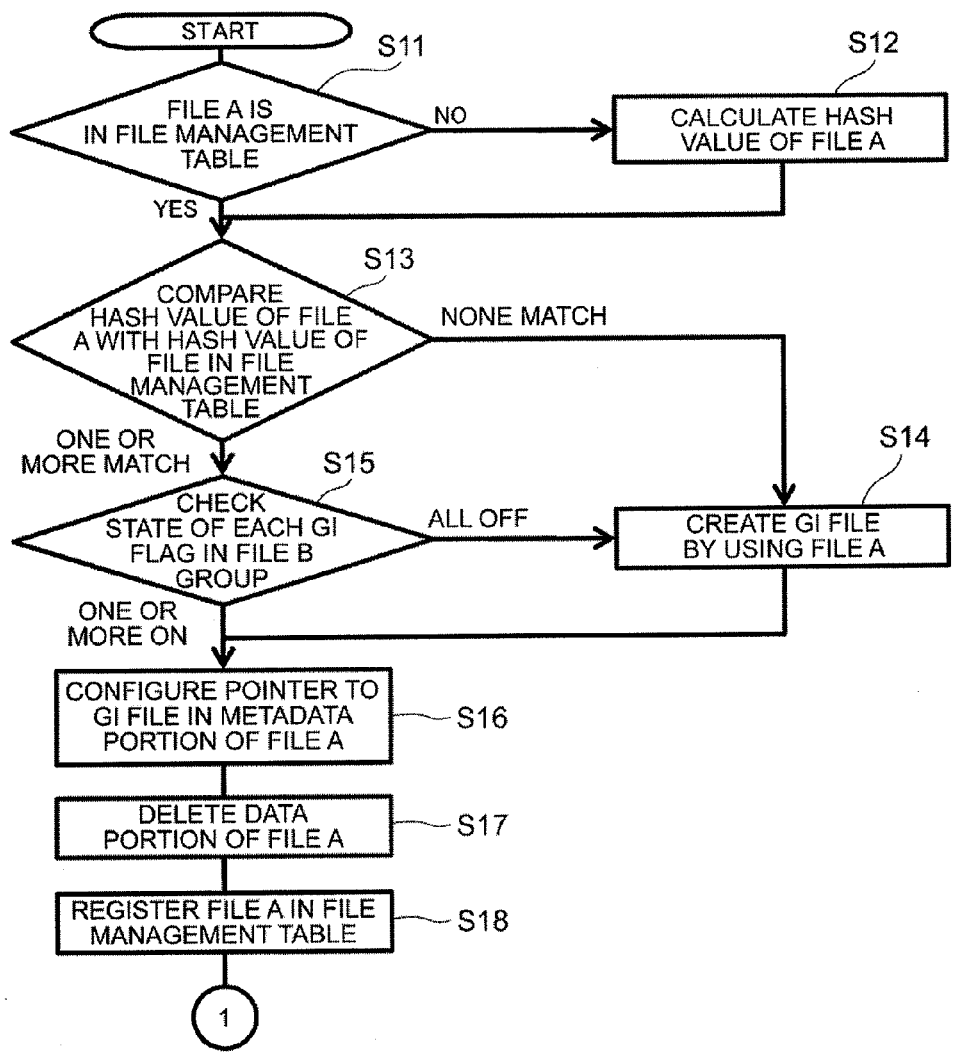
FIG. 10 is a flowchart serving to illustrate processing of a de-duplication program.
Figure 11:
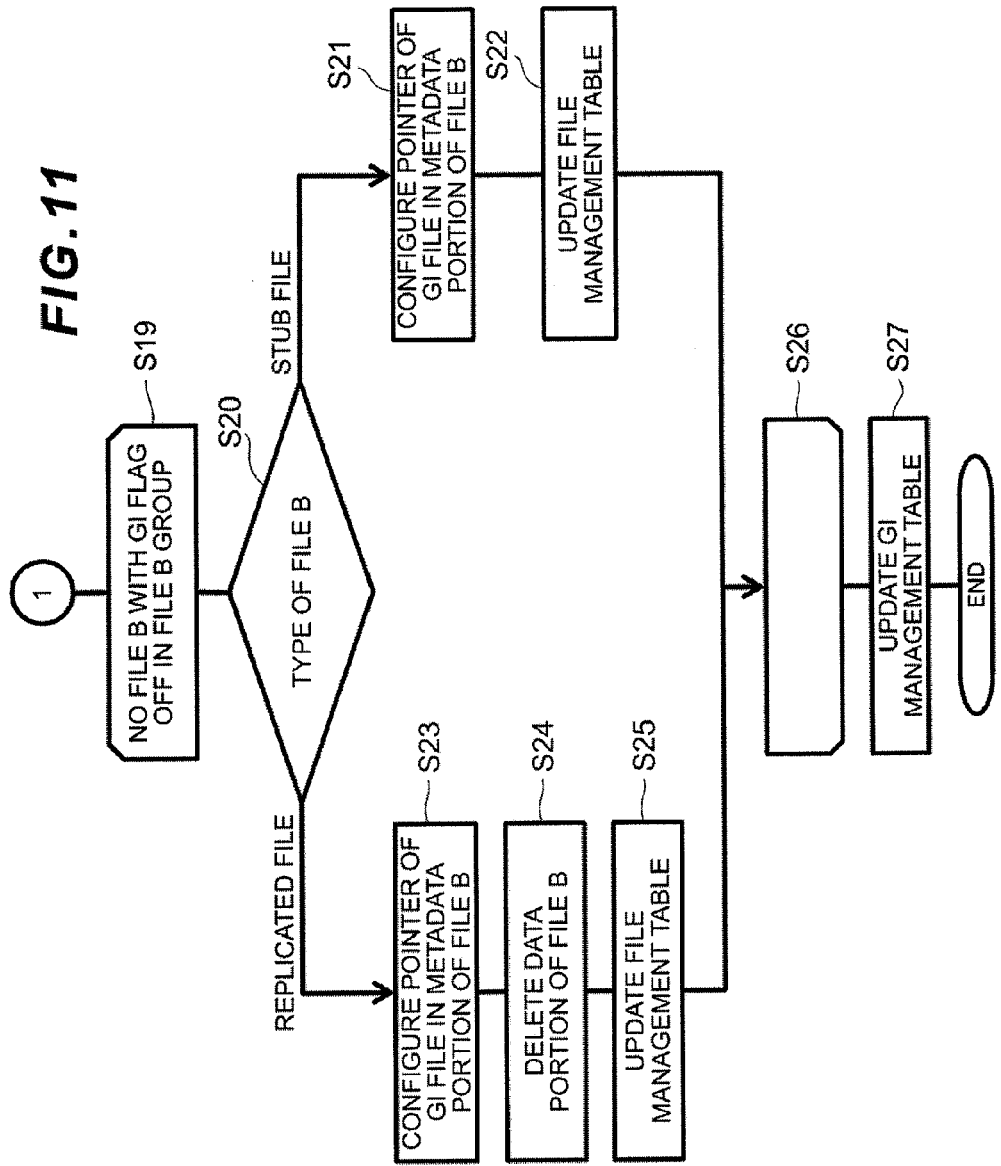
FIG. 11 is a flowchart serving to illustrate processing of a de-duplication program.

FIGS. 10 and 11 are flowcharts serving to illustrate the processing of the de-duplication program. This processing is started as a result of the CPU 50 starting the de-duplication program 62. Further, this processing is based on the premise that a normal file or replicated file is used as the de-duplication target file.

In FIG. 10, if a file 80 which is a normal file or replicated file, for example a file 80 with the file name A, is processed, the CPU 50 references the file management table 74 on the basis of the file 80 with the file name A and determines whether the file 80 with the file name A exists in the file management table 74 (S11).

If a negative determination result is obtained in step S11, that is, if the file 80 with the file name A is a new storage file, the CPU 50 calculates the hash value of the file 80 with the file name A (S12) and moves to the processing of step S13.

If an affirmative determination result is obtained in step S11, that is, if the file 80 with the file name A exists in the file management table 74, the CPU 50 compares the hash value of the file 80 with the file name A with the hash value of the file in the file management table 74 (S13). Note that if the file 80 with the file name A is a new storage file, the CPU 50 compares the hash value calculated in step S12 with the hash value of the file in the file management table 74.

If it is determined in step S13 that none of the hash values match, that is, if files with identical hash values do not exist, the CPU 50 uses the file 80 with the file name A to newly create the GI file 84 in order to store the data of the file 80 (S14) and moves to the processing of step S16. In this case, in step S16, the CPU 50 configures a pointer for which the newly created GI file 84 is the reference destination (data storage destination) in the metadata of the file 80 with the file name A, and subsequently deletes the data of the file 80 with the file name A (S17) and newly registers the file 80 with the file name A in the file management table 74 (S18).

If, on the other hand, it is determined in step S13 that one or more of the hash values match, that is, if one or more files with identical hash values exist, the CPU 50 checks the state of each GI flag in a group of files with file name B which are files with identical hash values (S15).

If it is determined in step S15 that the states of the GI flags in the group of files with file name B are all OFF, the CPU 50 uses a file 80 with file name A to newly create a GI file 84 for storing the data of the file 80 on condition that the GI file 84 does not exist on the disk 54 (S14) and moves to the processing of step S16. In this case, in step S16, the CPU 50 configures the pointer for which the newly created GI file 84 is the reference destination (data storage destination) in the metadata of the file 80 with the file name A, subsequently deletes the data of the file 80 with the file name A (S17), and registers the information of the file 80 with the file name A (information such as the hash value and file size) in the file management table 74 (S18).

If, on the other hand, it is determined in step S15 that one or more of the states of the GI flags in the group of files with file names B are ON, the CPU 50 configures a pointer for which an existing GI file 84 is the reference destination (data storage destination) in the metadata of a file 80 with the file name A on condition that the GI file 84 already exists on the disk 54 (S16), subsequently deletes the data of the file 80 with the file name A (S17) and registers information of the file 80 with the file name A (information such as the hash value and file size) in the file management table 74 (S18).

If it is determined for the group of files with the file name B that a file whose GI flag is OFF does not exist, the CPU 50 then moves from step S19 to the processing of step S26 (see FIG. 11).

If, on the other hand, it is determined for the group of files with the file name B that a file whose GI flag is ON exists, the CPU 50 executes the processing between steps S19 and S26.

In step S20, the CPU 50 determines whether the types of the files 80 with the file names B are stub files or replicated files. If a file 80 with the file name B is determined to be a stub file, the CPU 50 configures a pointer for which the GI file 84 is a reference destination (data storage destination) in the metadata of the file 80 with the file name B (S21), and then updates the information in the file management table 74 (S22). Thereupon, the CPU 50 references entries corresponding to the files 80 with the file name B in the file management table 74 and changes the recall flag from ON to OFF and changes the GI flag from OFF to ON.

If, on the other hand, it is determined in step S20 that the type of file 80 with the file name B is a replicated file, the CPU 50 configures a pointer for which the GI file 84 is the reference destination (data storage destination) is in the metadata of the file 80 with the file name B (S23), deletes the data of the file 80 with the file name B (S24) and updates the information of the file management table 74 (S25). Thereupon, the CPU 50 references an entry corresponding to the file 80 with the file name B in the file management table 74 and modifies the GI flag from OFF to the ON.

Thereafter, the CPU 50 updates information in the GI management table (S27) and ends the processing of this routine.

Note that, in step S27, if the file 80 is a new storage file, the CPU 50 registers information of the new storage file in all the fields in the GI management table 76, and if the file 80 is an existing file and a de-duplication target file, the CPU 50 increments the value of the reference counter in the GI management table 76 by one.

Figure 12:
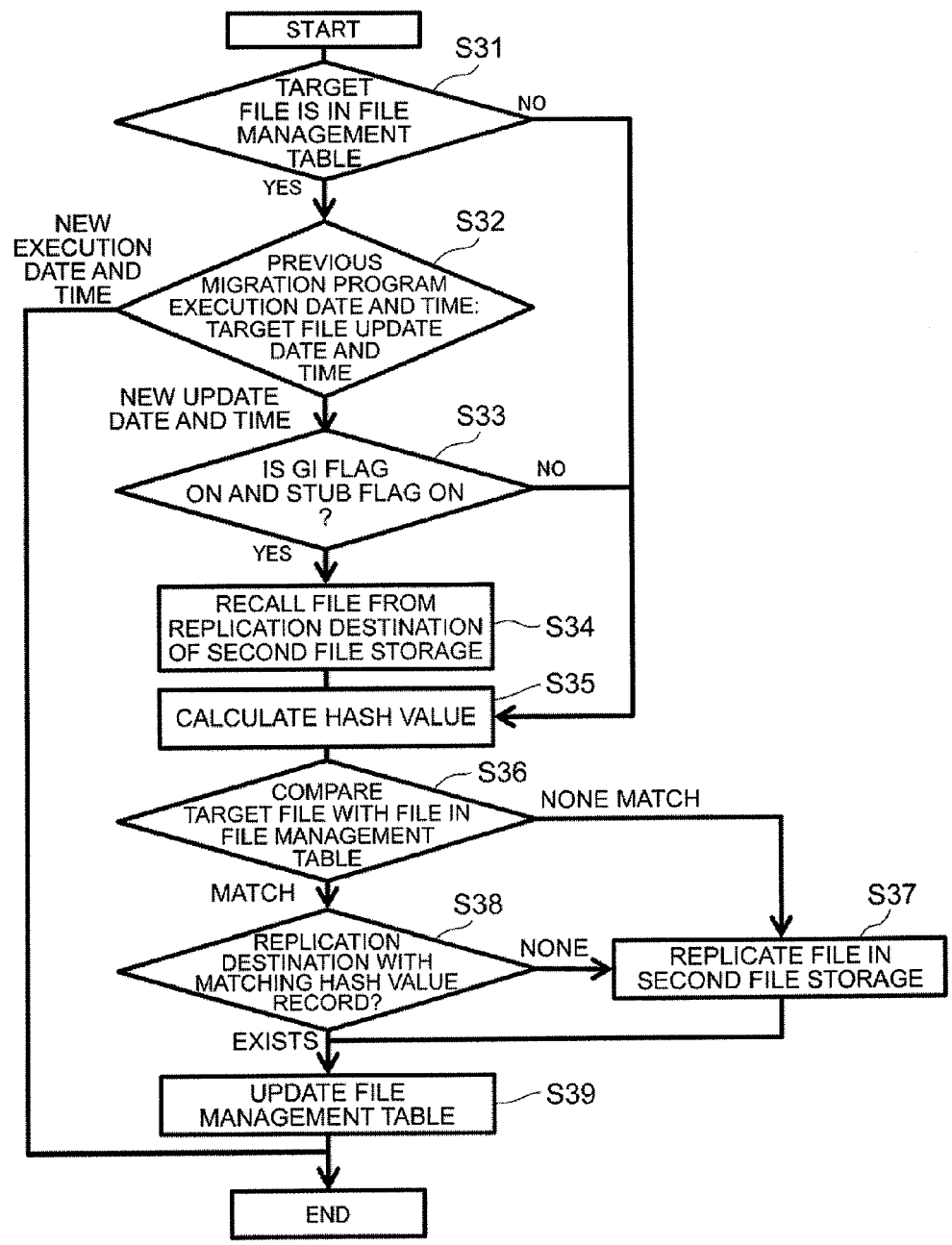
FIG. 12 is a flowchart serving to illustrate processing of a migration program.

FIG. 12 is a flowchart serving to illustrate the processing of the migration program. In FIG. 12, the processing is started as a result of the CPU 50 starting the migration program 64.

First, the CPU 50 determines whether the target file which is the migration target, for example any file among a normal file, a replicated file, or a stub file whose GI flag is ON, has been registered in the file management table 74 (S31). For example, if the file 80 with the file name A is selected as the target file, the CPU 50 references the file management table 74 on the basis of the file 80 with the file name A and determines whether the target file exists in the file management table 74.

If a negative determination result is obtained in step S31, that is, if a file 80 with the file name A has not been registered in the file management table 74, the CPU 50 calculates the hash value of the target file (file 80 with the file name A) (S35).

Thereafter, the CPU 50 compares the hash value of the target file with the hash value of the file registered in the file management table 74 and determines whether the two hash values match (S36). Upon determining in step S36 that none of the hash values match, the CPU 50 replicates the target file stored in the first file storage apparatus 26 to the second file storage apparatus 42 (S37), registers the target file (the file 80 with the file name A) in the file management table 74 as a new file, updates the information of all the fields corresponding to the new file in the file management table 74 (S39) and ends the processing of this routine.

If an affirmative determination result is obtained in step S31, for example if the target file is a stub file (stubbed file) for which the GI flag is ON and exists in the file management table 74, the CPU 50 references the file management table 74 on the basis of the target file, compares the previous migration program execution date and time with the target file update date and time, and determines which of the dates and times is new (S32).

If the previous migration program execution date and time is determined to be newer than the target file update date and time in step S32, that is, if the processing of the previous migration was executed after the update date was stored in the target file and there is no need to execute the migration processing once again, the CPU 50 ends the processing of this routine.

If it is determined in step S32 that the update date and time of the target file is newer than the previous migration program execution time, that is, if the update data was stored in the target file after the previous migration processing was executed, the CPU 50 determines, for the target file, whether the GI flag is ON and the stub file is ON (S33).

If a negative determination result is obtained in step S33, the CPU 50 calculates a target file hash value (S35).

If, on the other hand, an affirmative determination result is obtained in step S33, that is, if the target file is a stub file whose GI flag is ON and update data exists in the target file (if the data of the target file which exists in the first file storage apparatus 26 and the data of the replication file which exists in the second file storage apparatus 42 are different), the CPU 50 recalls the replication file from the replication destination of the second file storage apparatus 42 and calculates the hash value of the target file on the basis of data which includes data of the recalled replication file and the update data which exists in the target file (S35).

The CPU 50 then compares the hash value of the target file with the hash value of each file registered in the file management table 74 and determines whether both hash values match (S36). If it is determined in step S36 that the two hash values do not match at all, the CPU 50 replicates the target file (copy of the data including the update data) which is stored in the first file storage apparatus 26 to the second file storage apparatus 42 (S37), registers the target file in the file management table 74, manages the target file as a normal file, updates the stub flag to OFF in the information of the file management table 74 (S39), and ends the processing of this routine.

If, on the other hand, it is determined in step S36 that the two hash values match, the CPU 50 determines, for the target file, whether the replication destination in the second file storage apparatus 42 is registered in the file management table 74 (S38).

If a negative determination result is obtained in step S38, the CPU 50 replicates the target file including the update data to the second file storage apparatus 42 (S37), registers information including the hash value of the target file containing the update data, and the replication destination, in the file management table 74, updates the information of the file management table 74 (S39), and ends the processing of this routine.

If, on the other hand, an affirmative determination result is obtained in step S38, that is, if, for the target file containing the update data, the replication destination in the second file storage apparatus 42 has been registered in the file management table 74, [the CPU 50] registers hash value information for the target file containing the update data in the file management table 74, updates information of the file management table 74 (S39), and ends the processing in this routine.

Figure 13:
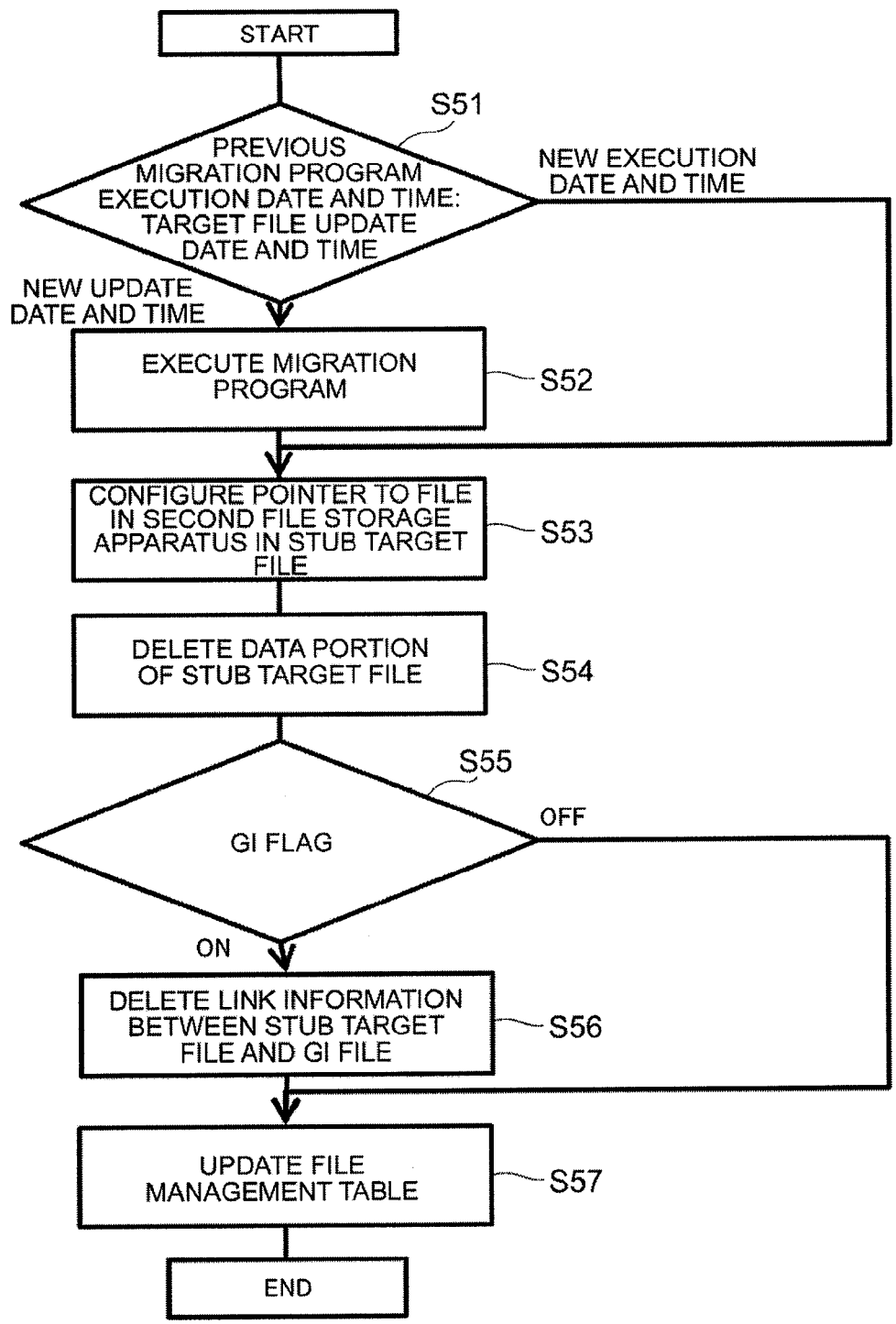
FIG. 13 is a flowchart serving to illustrate processing of a stubbing program.

FIG. 13 is a flowchart serving to illustrate the processing of the stubbing program. In FIG. 13, the processing is started as a result of the CPU 50 starting the stubbing program 66. Here, if the usage frequency of the stub target file which is the stubbing target is below a set value or if the remaining capacity of the stub target file is less than 10 percent, for example, the CPU 50 starts the stubbing program 66.

First, if a replicated file or a stub file whose GI flag is ON, for example, is selected as the stub target file, the CPU 50 refers to the file management table 74 for the selected stub target file, compares the previous migration program execution time with the target file update date and time, and determines whether either date and time is new (S51).

If it is determined in step S51 that the previous migration program execution date and time is newer than the stub target file update date and time, that is, if the previous migration processing is executed after the update data was stored in the stub target file, the CPU 50 moves to the processing of step S53.

If it is determined in step S51 that the update date and time of the stub target file is newer than the previous migration program execution date and time, that is, if the update data was stored in the stub target file after the previous migration processing was executed, the CPU 50 starts the migration program 64 in order to copy the update data to the replication file, replicates the update data to the second file storage apparatus 42, and stores the update data in the replication file which exists in the second file storage apparatus 42 (S52).

The CPU 50 then configures a pointer to the replication file in the second file storage apparatus 42 (the replication file whose update data was copied) in the stub target file (S53), and deletes the data of the stub target file (S54).

Subsequently, the CPU 50 determines whether the GI flag is ON or OFF for the stub target file (S55). If the CPU 50 determines in step S55 that the GI flag of the stub target file is OFF, the CPU 50 moves to the processing of step S57, and if it is determined in step S55 that the GI flag of the stub target file is ON, deletes link information which associates the stub target file with the GI file 84 (S56), changes the stub flag to ON, the recall flag to ON, and the GI flag to OFF in the file management table 74, updates the information of the file management table 74, and ends the processing of this routine.

Figure 14:
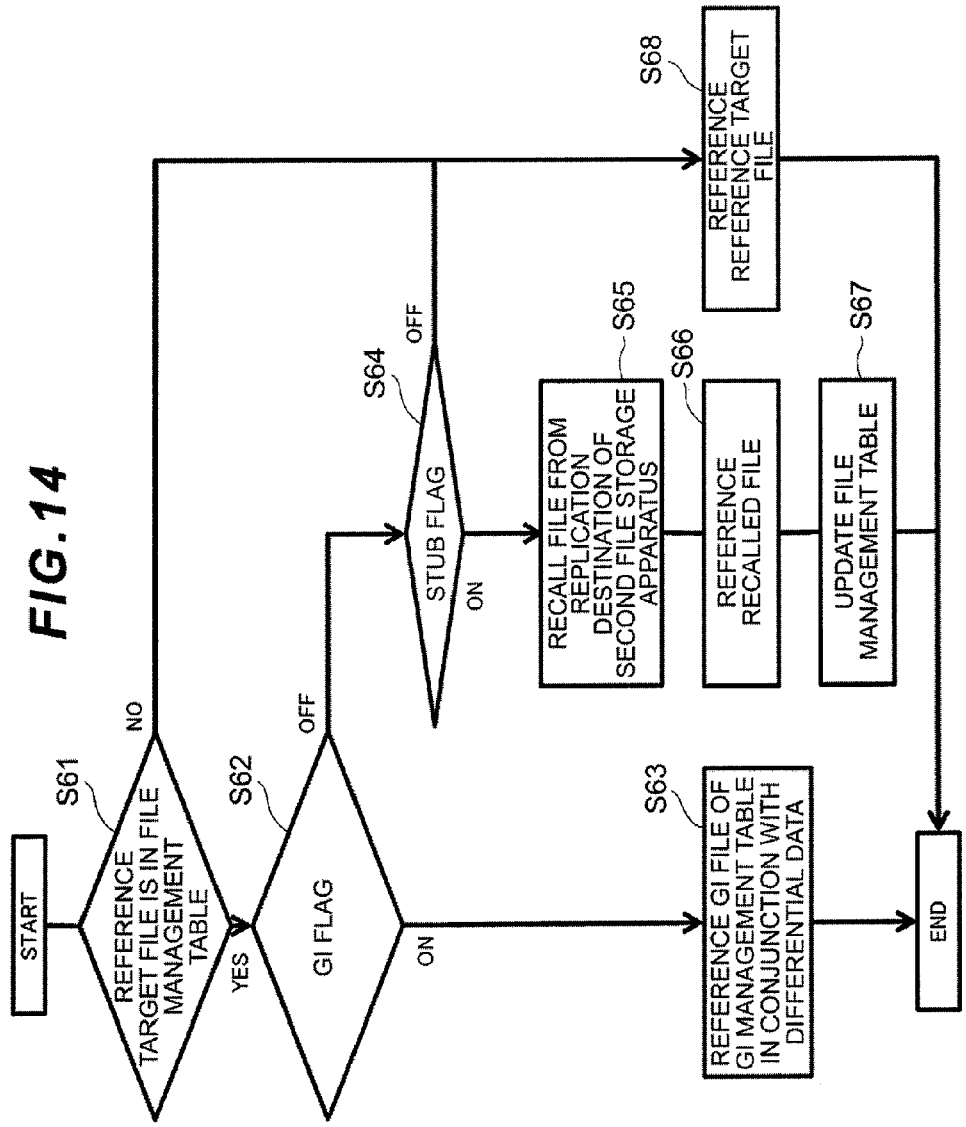
FIG. 14 is a flowchart serving to illustrate processing of a file referencing program.

FIG. 14 is a flowchart serving to illustrate the processing of the file referencing program. In FIG. 14, the processing is started as a result of the CPU 50 starting the file reference program 68.

Upon receipt of read access by the PC 20, the CPU 50 manages the file which is the read target as a reference target file, references the file management table 74 on the basis of the reference target file, and determines whether the reference target file exists in the file management table 74.

If a negative determination result is obtained in step S61, that is, if a reference target file is a new storage file and does not exist in the first file storage apparatus 26, the CPU 50 references the information of the reference target file (access request from the PC 20) (S68), and ends the processing of this routine.

If an affirmative determination result is obtained in step S61, that is, if the reference target file exists in the first file storage apparatus 26, the CPU 50 determines whether the GI flag of the reference target file is ON or OFF (S62).

If it is determined in step S62 that the GI flag of the reference target file is ON, the CPU 50 references the information of the GI file registered in the GI management table 76 together with the differential data (update data) (S63) and ends the processing of this routine.

Meanwhile, if it is determined in step S62 that the GI flag of the reference object file is OFF, the CPU 50 determines whether the stub flag of the reference target file is ON or OFF (S64).

If an affirmative determination result is obtained in step S64, the CPU 50 recalls the replication file (the replication file corresponding to the reference target file) from the replication destination of the second file storage apparatus 42 (S65), references the information of the recalled replication file (S66), changes the stub flag of the reference target file to OFF and the recall flag of the reference target file to OFF on the basis of the referenced information, and updates the information of the file management table 74 and ends the processing of this routine.

Meanwhile, if it is determined in step S64 that the stub flag is OFF, that is, if the reference target file is a replicated file, the CPU 50 references the information of the replicated file as a reference target file (S68), and ends the processing of this routine.

Figure 15:
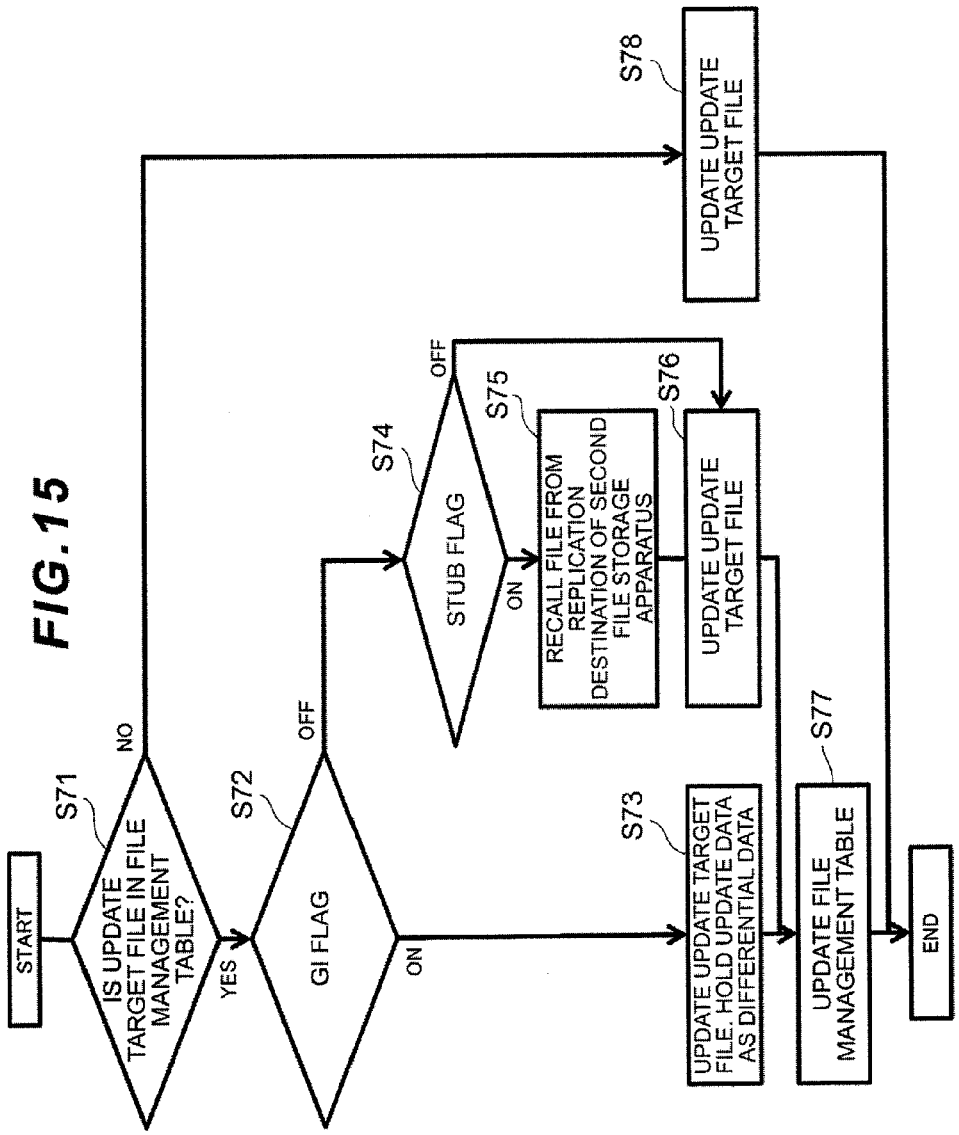
FIG. 15 is a flowchart serving to illustrate processing of a file update program.

FIG. 15 is a flowchart serving to illustrate the processing of the file update program. In FIG. 15, this processing is started as a result of the CPU 50 starting the file update program 70.

The CPU 50 references the file management table 74 on the basis of the inode of the update target file and determines whether the update target file exists in the file management table 74 (S71).

If an affirmative determination result is obtained in step S71, the CPU 50 determines whether the GI flag of the update target file is ON (S72).

If an affirmative determination result is obtained in step S72, the CPU 50 updates the information of the update target file and holds the update data as a differential (S73), subsequently changes the file update date and time of the update target file, updates the information of the file management table 74 (S77), and ends the processing of this routine.

If it is determined in step S72 that the GI flag of the update target file is OFF, the CPU 50 determines whether the stub flag of the update target file is ON or OFF (S74).

If it is determined in step S74 that the stub flag of the update target file is ON, that is, if the update target file is a stub file, the CPU 50 recalls the replication file corresponding to the update target file from the replication destination of the second file storage apparatus 42 (S75), updates the update target file using the data of the recalled replication file (S76), and manages the update target file by changing the update target file from a stub file to a normal file.

Thereafter, the CPU 50 changes the stub flag of the update target file from ON to OFF, changes the recall flag of the update target file from ON to OFF, updates the information of the file management table 74 (S77), and ends the processing of this routine.

Further, if it is determined in step S74 that the stub flag of the update target file is OFF, the CPU 50 updates the update target file as a replicated file (S76), subsequently updates the information of the file management table 74 (S77), and ends the processing of this routine.

If, on the other hand, a negative determination result is obtained in step S71, that is, if the update target file is a new storage file, the CPU 50 updates the update target file as a new storage file (S78), and ends the processing of this routine.

Figure 16:
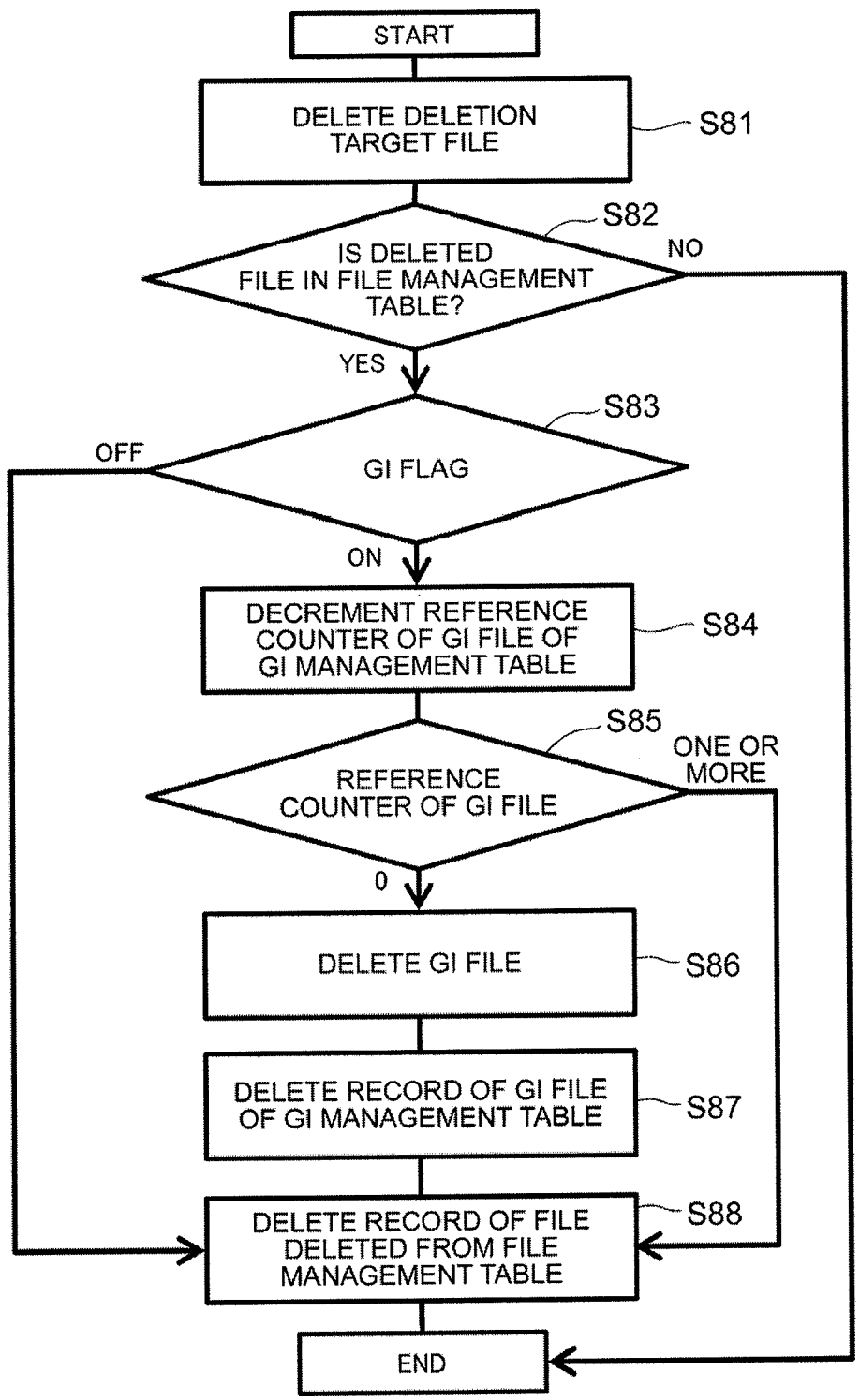
FIG. 16 is a flowchart serving to illustrate processing of a file deletion program.

FIG. 16 is a flowchart serving to illustrate the processing of the file deletion program. In FIG. 16, this processing is started as a result of the CPU 50 starting the file deletion program 72.

First, the CPU 50 searches for the first file system 30 on the basis of the inode of the deletion target file, deletes a deletion target file in the first file system 30 (S81), references the file management table 74 on the basis of the inode of the deletion target file, and determines whether the deletion target file exists in the file management table 74 (S82).

If a negative determination result is obtained in step S82, that is, if the deletion target file is a new storage file, the CPU 50 determines that the deletion target file does not exist in the first file system 30 and ends the processing of this routine.

If an affirmative determination result is obtained in step S82, the CPU 50 determines whether the GI flag of the deletion target file is ON or OFF (S83).

If it is determined in step S83 that the GI flag of the deletion target file is OFF, that is, if the deletion target file is a replicated file, the CPU 50 deletes the record of the deletion target file from the file management table 74 (S88), and ends the processing of this routine.

If it is determined in step S83 that the GI flag of the deletion target file is ON, the deletion target file is the de-duplication target file, that is, if the deletion target file is a de-duplication target file, the CPU 50 references the inode management table 78 and the GI management table 76 on the basis of the inode of the deletion target file, and decrements the reference counter of the GI file of the GI management table 76 (reference counter value −1) (S84).

The CPU 50 then references the GI management table 76 on the basis of the inode of the deletion target file and determines whether the value of the reference counter of the GI file 84 is 0 or 1 or one or more (S85).

If it is determined that the counter of the GI file of the deletion target file is "0", that is, the value of the reference counter is changed from "1" to "0" as a result of deleting the deletion target file, the CPU 50 deletes the GI file 84 which is a data storage destination of the deletion target file from the disk 54 (S86), deletes the record of the deleted GI file 84 in the GI management table 76 (S87), deletes the record of the deleted deletion target file in the file management table 74 (S88), and ends the processing of this routine.

If, on the other hand, it is determined in S85 that the value of the reference counter of the GI file of the deletion target file is one or more, for example if the value of the reference counter is changed from "2" to "1", the CPU 50 deletes the record of the deleted deletion target file in the file management table 74 (S88), and ends the processing of this routine.

In this embodiment, if the first file 80 among the plurality of files 80 is stored on the disk 54, the CPU 50 is able to transfer the copy of the first file 80 to the second file storage apparatus 42 via the network 18, manage the copy of the transferred first file 80 as the first replication file 100, and configure the first pointer indicating the replication destination of the first replication file 100 in the metadata of the first file 80, and if a second file 80 comprising identical data to the first file 80 is subsequently stored on the disk 54, the CPU 50 is able to manage the first file 80 and second file 80 as de-duplication target files, configure a first reference destination to the effect that the storage destination of the first data comprising the first file 80 is the GI file 84 or the second file 80, for example, in the metadata of the first file 80 or configure a second reference destination to the effect that the storage destination of the second data comprising the second file 80, for example the GI file 84 or the first file 80, in the metadata of the second file 80.

Here, the CPU 50 manages the first replication file 100 as a copy of the first file 80 and a copy of the second file 80, configures a first pointer indicating the replication destination of the first replication file 100 in the metadata of the second file 80, deletes the first data on condition that the storage destination of the first data has been configured in the metadata of the first file 80, or deletes the second data on condition that the storage destination of the second data has been configured in the metadata of the second file 80.

In this case, because the CPU 50 manages the first replication file 100 as a copy of the first file 80 and a copy of the second file 80, the CPU 50 need not transfer the data of the replication file which is a copy of the second file 80 from the first file storage apparatus 26 to the second file storage apparatus 42 via the network 18, whereby the data transfer amount can be reduced and an increase in the line load of the network 18 can be suppressed.

Furthermore, when processing the second file 80 or the third file 80 as a de-duplication target file in the process of managing the first file 80 by changing the first file 80 from a first normal file to a first stub file, the CPU 50 is able to store second data which comprises the second file 80 or third data which comprises the third file in the first stub file, and manage the first file 80 by restoring the first file 80 from a first stub file to a first normal file.

In this case, even when the first file 80 which is the first normal file is accessed, because the second data or third data corresponding to the first data exists in the first file, the CPU 50 need not recall the data of the replication file 100 from the second file storage apparatus 42, whereby the data transfer amount from the second file storage apparatus 42 to the first storage apparatus 26 can be reduced, and an increase in the line load of the network 18 can be suppressed.

Further, when processing the second file 80 as a de-duplication target file in the process of managing the first replication file 100 as a copy of the first file 80 and managing the first file 80 by changing the first file 80 from a first normal file to a first stub file, the CPU 50 is able to create a GI file 84, store the second data comprising the second file 80 in the GI file 84 thus created, manage the replication file 100 as a copy of the second file 80, configure a second reference destination to the effect that the storage destination of the second data is the GI file 84 in the metadata of the second file 80, configure a first reference destination to the effect that the storage destination of the first data is the GI file 84 in the metadata of the first stub file which is the first file, and subsequently manage the second file as a de-duplicated file on condition that the second data is deleted.

In this case, even when the first file 80 or the second file 80 is subject to read access, by retrieving the metadata of the first file 80 or second file 80, [the CPU 50] is able to reference the data stored in the GI file 84. In addition, by managing the replication file 100 as a copy of the second file 80, when processing the second file 80 as a de-duplication target file, the CPU 50 need not recall the data of the replication file 100 from the second file storage apparatus 42, whereby the data transfer amount from the second file storage apparatus 42 to the first storage apparatus 26 can be reduced, and an increase in the line load of the network 18 can be suppressed.

Further, when processing a plurality of other files 80 as de-duplication target files in the process of managing the first file 80 by managing the first file 80 by changing the first file 80 from a first normal file to a first stub file, the CPU 50 is able to manage the replication file 100 as a copy of each of the other files 80, configure a reference destination to the effect that the storage destination of the data of each of the other files 80 is the GI file 84 in the metadata of each of the other files 80, and subsequently manage each of the other files as de-duplicated files on condition that the data of each of the other files is deleted. In this case, [the CPU 50] need not store the data of each of the other files 80 on the disk 54, and therefore an increase in the capacity of the data to be stored on the disk 54 can be suppressed.

With this Example, the data transfer amount can be reduced when processing the de-duplication target files.

Note that the present invention is not limited to the above Example, rather, the present invention encompasses various modifications. The present invention is not necessarily limited to comprising all the configurations described. Further, other configurations may be added to or replace a portion of the configurations of this Example or a portion of the configurations may be removed.

Furthermore, the foregoing configurations and functions and so on may each be realized by hardware by designing a portion or all of the foregoing configurations and functions by means of an integrated circuit or circuits, for example. Further, the foregoing configurations and functions and so on may each be realized by software as a result of a processor parsing and executing programs which realize the respective functions. Information of programs, tables and files which realize each of the functions can be recorded on recording devices such as memory, hard disks, SSDs (Solid State Drive) or on recording media such as IC (Integrated Circuit) cards, SD (Secure Digital) memory cards, or DVDs (Digital Versatile Disc).

REFERENCE SIGNS LIST 10, 12, 14 Edge site
16 Core site
18 Network
26 First file storage apparatus
30 First file system
42 Second file storage apparatus
46 Second file system
50 CPU
52 Memory
54 Disk
80 File

The invention claimed is:

1. A storage system, comprising:
a plurality of first file storage apparatuses which comprise a first file system; and
a second file storage apparatus which is connected to each of the first file storage apparatuses via a network and which comprises a second file system,
wherein the first file storage apparatuses each comprise:
a storage device which stores a plurality of files comprising the first file system; and
a first controller which controls data I/O processing of the storage device on the basis of an access request from an access request source, and which exchanges information with the second file storage apparatus via the network,
wherein, if a first file is stored in the storage device, the first controller transfers a copy of the first file to the second file storage apparatus via the network, manages the transferred copy of the first file as a first replication file, and configures, in the first file, a first pointer indicating a replication destination of the first replication file, and
wherein, if a second file which comprises the same data as the first file is stored in the storage device, the first controller manages the second file as a de-duplication target file, manages the first replication file as a copy of the first file and a copy of the second file, configures the first pointer in the second file, and deletes the first data on condition that a storage destination of the first data comprising the first file has been configured in the first file, or deletes the second data on condition that a storage destination of the second data comprising the second file has been configured in the second file,
wherein, if the second file is managed as the de-duplication target file, the first controller creates a shared file, stores second data which comprises the second file in the created shared file, configures a second reference destination to the effect that the storage destination of the second data is the shared file, in second metadata for managing the second data, manages the second file as a second de-duplicated file on condition that the second data has been deleted, manages the first replication file as a copy of the second file, and manages the replication destination of the copy of the second file as the replication destination of the first replication file, and
wherein, if the first file is managed by changing the first file from a first normal file which comprises the first data and first metadata for managing the first data to a first stub file for which only the first metadata exists, the first controller configures a first reference destination to the effect that the storage destination of the first data is the shared file in the first metadata of the first stub file.

2. The storage system according to claim 1, wherein, in the process in which the first controller manages the first file by changing the first file from a first normal file comprising the first data to a first stub file from which the first data was deleted, on condition that the second data has been stored in the first stub file, the first controller manages the first file by restoring the first file from the first stub file to the first normal file.

3. The storage system according to claim 1, wherein, if the second file is managed as the de-duplication target file, the first controller creates a shared file, stores second data which comprises the second file in the created shared file, configures a second reference destination to the effect that the storage destination of the second data is the shared file, in second metadata for managing the second data, and configures a first reference destination to the effect that the storage destination of the first data is the shared file in the first metadata for managing the first data.

4. The storage system according to claim 1, wherein, if a first reference request for the first file is received from the access request source, the first controller searches for the first reference destination configured in the first metadata of the first stub file, references the shared file, and transmits the reference result to the access request source.

5. The storage system according to claim 1, wherein, if a second reference request for the second file is received from the access request source, the first controller searches for the second reference destination configured in the second metadata of the second de-duplicated file, references the shared file, and transmits the reference result to the access request source.

6. The storage system according to claim 1, wherein, when constructing a third file which comprises the same data as the first file in the storage device, the first controller manages the third file as the de-duplication target file, deletes third data which comprises the third file, configures a third reference destination to the effect that the storage destination of the third data is the shared file, in the third metadata for managing the third data, manages the third file by changing the third file from the de-duplication target file to a de-duplicated file on condition that the third data has been deleted, manages the first replication file as a copy of the third file, and manages the replication destination of the copy of the third file as the replication destination of the first replication file.

7. A file management method of a storage system, comprising:
a plurality of first file storage apparatuses which comprise a first file system; and
a second file storage apparatus which is connected to each of the first file storage apparatuses via a network and which comprises a second file system,
wherein the first file storage apparatuses each comprise:
a storage device which stores a plurality of files comprising the first file system; and
a first controller which controls data I/O processing of the storage device on the basis of an access request from an access request source, and which exchanges information with the second file storage apparatus via the network,
the file management method comprising:
a first step in which, if a first file is stored in the storage device, the first controller transfers a copy of the first file to the second file storage apparatus via the network, manages the transferred copy of the first file as a first replication file, and configures, in the first file, a first pointer indicating a replication destination of the first replication file;
a second step in which, if a second file which comprises the same data as the first file is stored in the storage device, the first controller manages the second file as a de-duplication target file, manages the first replication file as a copy of the first file and a copy of the second file, and configures the first pointer in the second file; and a third step in which the first controller deletes the first data on condition that a storage destination of the first data comprising the first file has been configured in the first file, or deletes the second data on condition that a storage destination of the second data comprising the second file has been configured in the second file,
wherein, in the second step, if the second file is managed as the de-duplication target file, the first controller creates a shared file, stores second data which comprises the second file in the created shared file, configures a second reference destination to the effect that the storage destination of the second data is the shared file, in second metadata for managing the second data, manages a second file in which only the second metadata exists as a second de-duplicated file on condition that the second data has been deleted, manages the first replication file as a copy of the second file, and manages the replication destination of the copy of the second file as the replication destination of the first replication file, and
wherein, after the third step, the first controller executes a fourth step in which, if the first file is managed by changing the first file from a first normal file which comprises the first data and first metadata for managing the first data to a first stub file for which only the first metadata exists, and, in the fourth step, the first controller configures a first reference destination to the effect that the storage destination of the first data is the shared file in the first metadata of the first stub file.

8. The file management method according to claim 7, wherein the first controller executes a fourth step in which the first file is managed by changing the first file from a first normal file comprising the first data to a first stub file from which the first data was deleted, and, in this fourth step, on condition that the second data has been stored in the first stub file, the first controller manages the first file by restoring the first file from the first stub file to the first normal file.

9. The file management method according to claim 7, wherein, in the second step, if the second file is managed as the de-duplication target file, the first controller creates a shared file, stores second data which comprises the second file in the created shared file, configures a second reference destination to the effect that the storage destination of the second data is the shared file, in second metadata for managing the second data, deletes the first data of the first file, and configures a first reference destination to the effect that the storage destination of the first data is the shared file in the first metadata for managing the first data.

10. The file management method according to claim 7, wherein, if a first reference request for the first file is received from the access request source, the first controller executes a fifth step of searching for the first reference destination configured in the first metadata of the first stub file, referencing the shared file, and transmitting the reference result to the access request source.

11. The file management method according to claim 7, wherein, if a second reference request for the second file is received from the access request source, the first controller executes a fifth step of searching for the second reference destination configured in the second metadata of the second de-duplicated file, referencing the shared file, and transmitting the reference result to the access request source.

12. The file management method according to claim 7, wherein, when constructing a third file which comprises the same data as the first file in the storage device, the first controller executes a fifth step of managing the third file as the de-duplication target file, and, in the fifth step, deletes third data which comprises the third file, configures a third reference destination to the effect that the storage destination of the third data is the shared file, in the third metadata for managing the third data, manages the third file by changing the third file from the de-duplication target file to a de-duplicated file on condition that the third data has been deleted, manages the first replication file as a copy of the third file, and manages the replication destination of the copy of the third file as the replication destination of the first replication file.

* * * * *